J. NEWLIN.
PACKING.
APPLICATION FILED AUG. 8, 1911.
1,023,525.
Patented Apr. 16, 1912.
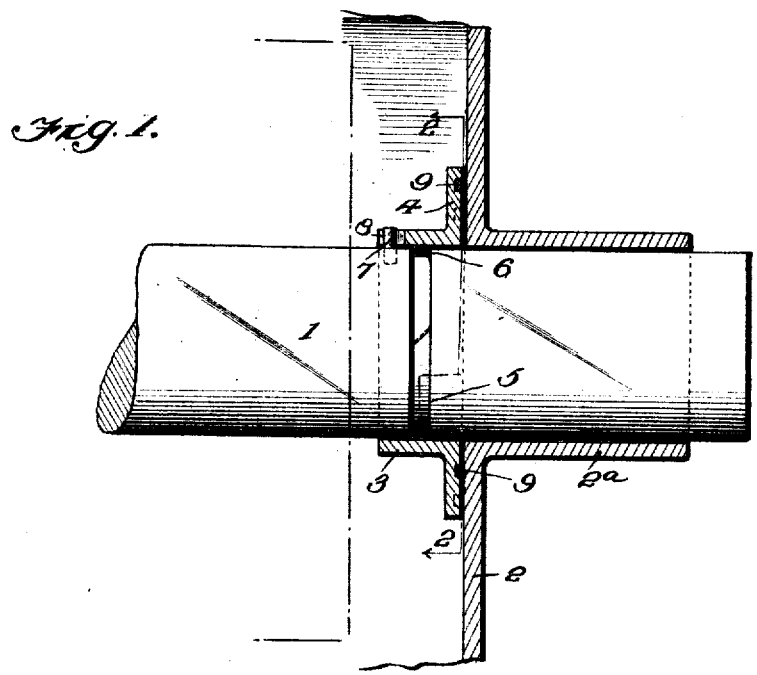
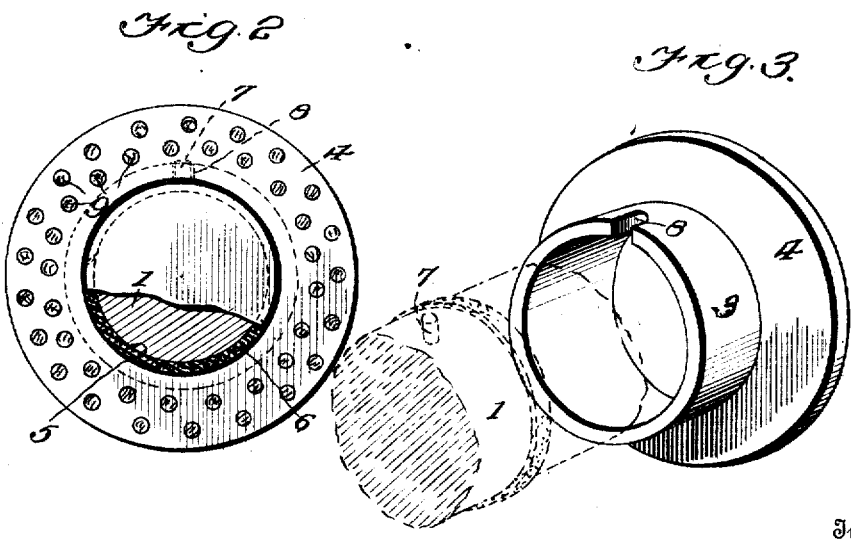
Witnesses
Inventor
James Newlin.
By
Attorneys

UNITED STATES PATENT OFFICE.

JAMES NEWLIN, OF BURLINGTON, NORTH CAROLINA.

PACKING.

1,023,525.     Specification of Letters Patent.    Patented Apr. 16, 1912.

Application filed August 8, 1911. Serial No. 643,020.

*To all whom it may concern:*

Be it known that I, JAMES NEWLIN, citizen of the United States, residing at Burlington, in the county of Alamance and State of North Carolina, have invented certain new and useful Improvements in Packing, of which the following is a specification.

This invention comprehends certain new and useful improvements in packing, and relates particularly to packing for rotary engines, elastic fluid turbines, and the like, where difficulty has heretofore been experienced in preventing the fluid pressure medium from leaking out of the casing through the bearings in which the rotor or the shaft thereof is journaled.

The invention has for its primary object a very simple and inexpensive construction of rotary engine packing, which can be easily applied to the rotating element, and which will be positive in its action to preclude the possibility of any leakage of pressure, the packing having a limited longitudinal movement on the rotating element that carries it and being held by the expansive power of the elastic fluid medium out against the inner wall of the casing at the bearing, so as to produce a very effective and non-leaking joint.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawing, in which:

Figure 1 is a sectional view of one of my improved packings, the same being shown in applied position and only so much of a rotary engine being shown, as is necessary to illustrate the application of the device, and its operation. Fig. 2 is an end elevation of the packing in applied position, the section being taken on the line 2—2 of Fig. 1; and Fig. 3 is a perspective view thereof, detached.

Corresponding and like parts are referred to in the following description and indicated in all the views of the drawings by the same reference characters.

In the accompanying drawing, for the purpose of illustration only, I have shown a rotating element 1 in the form of a shaft, although it is to be understood that the device may be applied with equal facility to a rotor mounted on a shaft, and at 2 is shown a portion of one head of the engine casing, the same being formed with the ordinary bearing sleeve 2ª in which the rotating element is journaled.

My improved packing comprises a cylindrical member or collar 3 which is mounted for a limited longitudinal movement on the rotating element 1, said collar being formed with an outstanding annular flange 4 which is adapted to abut against the inner wall of the head 2 of the casing at the journal joint, as clearly illustrated in Fig. 1.

The rotating element or shaft 1 is formed with an annular groove 5, in which a packing ring 6 is mounted, said ring being expansible and bearing tightly against the inner wall of the collar 3.

The rotating element or shaft 1 has a pin 7 secured to it, and the collar 3 is formed in its adjoining edge with a recess 8 accommodating said pin, whereby to limit the movement of the collar in one direction upon the shaft and to compel said collar to turn with the shaft, while at the same time the collar is permitted to have a free movement toward the adjoining wall of the casing.

From the foregoing description in connection with the accompanying drawing, the operation of my improved packing will be apparent.

In the practical use of the device, the pressure of the elastic fluid medium, such as steam for instance, will act upon the flange 4 in a manner to securely hold the same in engagement with the inner face of the casing wall so as to preclude the possibility of a leak at this point, and the packing ring thus will correspondingly prevent any leakage between the rotating shaft 1 and the packing collar.

Thus it will be seen that I have provided a very simple and inexpensive packing for rotary engines and the like, which may be easily applied and which will not be liable to get out of order, or become defective in use.

While the accompanying drawing shows what I believe to be the preferred embodiment of my invention, it is to be understood that the invention is not limited thereto, but that various changes may be made in the construction, arrangement and proportions of the parts without departing from the scope of the invention as defined in the appended claims.

Preferably, the outer face of the bearing collar has partially embedded therein a predetermined number of settings 9 of block tin, so as to reduce the friction.

Having thus described the invention, what is claimed as new is:

1. The combination with a casing wall and a rotary element journaled therein, of a packing collar mounted on said rotary element, a packing ring encircling said element within the collar and expanding against the inner wall of the latter, the collar being formed with an outstanding flange adapted to abut against said wall, and a connection between said collar and rotary element permitting a limited longitudinal movement of the former, but compelling a simultaneous rotary movement of the two.

2. The combination with a casing wall and a rotary element journaled therein, of a packing collar snugly encircling the rotary element, but movable longitudinally thereon, said collar being formed with an outstanding annular flange adapted to abut against said wall and being formed in its opposite edge with a recess, the rotary element being formed with an annular groove, a packing ring mounted in said groove and expanding against the inner wall of the collar, and a pin secured to the rotary element and accommodated in said recess, for the purpose specified.

In testimony whereof, I affix my signature in presence of two witnesses.

JAMES NEWLIN. [L. S.]

Witnesses:
W. N. WOODSON,
FREDERICK S. STITT.